United States Patent
Arai et al.

(10) Patent No.: US 7,714,962 B2
(45) Date of Patent: May 11, 2010

(54) HOMEOTROPIC ALIGNMENT TYPE SEMI-TRANSMISSIVE REFLECTIVE LIQUID CRYSTAL DISPLAY DEVICE

(75) Inventors: Norihiro Arai, Hino (JP); Toshiharu Nishino, Hamura (JP); Kunpei Kobayashi, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 328 days.

(21) Appl. No.: 11/605,078

(22) Filed: Nov. 28, 2006

(65) Prior Publication Data
US 2007/0121037 A1 May 31, 2007

(30) Foreign Application Priority Data
Nov. 29, 2005 (JP) ............................. 2005-344131

(51) Int. Cl.
*G02F 1/1335* (2006.01)
(52) U.S. Cl. ...................................... 349/113; 349/114
(58) Field of Classification Search ................. 349/113
See application file for complete search history.

(56) References Cited

U.S. PATENT DOCUMENTS

| 5,309,264 | A | 5/1994 | Lien et al. |
| 6,507,375 | B1 * | 1/2003 | Kawahata ................... 349/38 |
| 6,774,967 | B2 | 8/2004 | Kim et al. |
| 7,256,846 | B2 | 8/2007 | Maeda |
| 7,446,836 | B2 * | 11/2008 | Kurashima .................. 349/114 |
| 2005/0122452 | A1 * | 6/2005 | Yoshida et al. .............. 349/114 |
| 2007/0091233 | A1 | 4/2007 | Maeda |
| 2007/0199504 | A1 | 8/2007 | Nakamura et al. |

FOREIGN PATENT DOCUMENTS

| CN | 15343354 A | 10/2004 |
| CN | 1573430 A | 2/2005 |

(Continued)

OTHER PUBLICATIONS

Japanese Office Action dated May 26, 2009 (3 pages), and English translation thereof (3 pages), issued in counterpart Japanese Application Serial No. 2005-344131.

(Continued)

*Primary Examiner*—Uyen-Chau N Le
*Assistant Examiner*—Chris H Chu
(74) *Attorney, Agent, or Firm*—Frishauf, Holtz, Goodman & Chick, P.C.

(57) ABSTRACT

A liquid crystal display device has a pair of substrates disposed at an observer side and at the opposite side to the observer side, a plurality of pixel electrodes and an opposing electrode which are formed on the internal surfaces of the pair of substrates, a reflective layer, and liquid crystal sealed between these substrates. Each pixel electrode has a reflective display region corresponding to the reflective layer for reflecting light that enters from the observer side to the observer side, and a transmissive display region for allowing light that enters from the opposite side to pass therethrough to the observer side. A liquid crystal layer thickness adjusting layer is formed on the internal surface of the substrate at the observer side, for setting the liquid crystal layer thickness in the reflective display region to be smaller than the liquid crystal layer thickness in the transmissive display region.

20 Claims, 7 Drawing Sheets

FOREIGN PATENT DOCUMENTS

| | | | |
|---|---|---|---|
| CN | 1645225 A | 7/2005 |
| JP | 2565639 B2 | 10/1996 |
| JP | 11-52422 A | 2/1999 |
| JP | 2001-242466 A | 9/2001 |
| JP | 2005-107277 A | 4/2005 |
| JP | 2005107277 A | * | 4/2005 |
| JP | 2005-250430 A | 9/2005 |
| KR | 2004-0108604 A | 12/2004 |
| KR | 20040108604 | * | 12/2004 |
| WO | WO 2005/111708 A1 | 11/2005 |

OTHER PUBLICATIONS

Japanese Office Action dated Feb. 23, 2010 and English translation thereof issued in counterpart Japanese Application No. 2005-344131.

* cited by examiner

HOMEOTROPIC ALIGNMENT TYPE SEMI-TRANSMISSIVE REFLECTIVE LIQUID CRYSTAL DISPLAY DEVICE

BACKGROUND OF THE INVENTION

1. Field of the Invention

The present invention relates to a homeotropic alignment type liquid crystal display device which performs transmissive display and reflective display.

2. Description of the Related Art

A homeotropic alignment type active matrix liquid crystal display device has been known. This liquid crystal display device comprises a pair of substrates facing each other with a predetermined gap therebetween, and a liquid crystal layer having negative dielectric anisotropy, which is sealed between the pair of substrates. Of the facing internal surfaces of the pair of substrates, the internal surface of one substrate has thereon, a plurality of pixel electrodes arranged in a row direction and in a column direction in a matrix, a plurality of thin film transistors (hereinafter referred to as TFT) provided correspondingly to the plurality of pixel electrodes respectively and connected to the corresponding pixel electrodes, and a plurality of gate lines and data lines formed between the rows of pixel electrodes and between the columns of pixel electrodes for supplying a gate signal and a data signal to the pixel electrodes in the corresponding rows and corresponding columns. An opposing electrode, which faces each of the plurality of pixel electrodes, is formed on the internal surface of the other substrate of the pair of substrates. Further, a homeotropic alignment film is formed on the internal surface of each of the pair of substrates so as to cover the above-described electrode(s).

This homeotropic alignment liquid crystal display device has its pixels defined by the regions where the plurality of pixel electrodes and the opposing electrode face each other, and displays an image by controlling the alignment of the liquid crystal molecules by applying a voltage across the facing electrodes in each of the plurality of pixels. In this case, by the application of the voltage, the liquid crystal molecules of each pixel are aligned to lie down toward the substrate surface from the homeotropically aligned state.

In such a homeotropic alignment liquid crystal display device, the direction in which the liquid crystal molecules are aligned and lie down in response to the voltage applied, is not uniform throughout the pixels. Therefore, the alignment state of the liquid crystal molecules varies from pixel to pixel, producing display unevenness.

Hence, such a liquid crystal display device is proposed, whose pixels each have a plurality of domains with different directions in which the liquid crystal molecules are aligned, in order to stabilize the alignment state of each pixel and to have a wide view angle characteristic.

For example, as described in the publication of the U.S. Pat. No. 2,565,639, such a homeotropic alignment liquid crystal display device has X-shaped openings formed in the opposing electrode, so that when a voltage is applied across the two facing electrodes, the liquid crystal molecules in each pixel may be aligned to lie down in four directions toward the center of the X-shaped opening.

However, this liquid crystal display device is a device for transmissive display and cannot perform reflective display. Further, the X-shaped opening needs to be formed to have a sufficiently large width, since it is necessary to make each pixel have domains whose alignment directions are different from each other due to the X-shaped opening formed in the pixel, and this requires the respective domains not to interfere with each other. Accordingly, in each pixel, the area of the opening, which cannot be controlled by an electric field, is increased to thereby reduce the area over which the electrodes face each other, raising a problem that the aperture ratio is reduced.

SUMMARY OF THE INVENTION

An object of the present invention is to provide a homeotropic alignment liquid crystal display device which can perform both reflective display utilizing light that enters from the observer side, and transmissive display utilizing light that enters from an opposite side to the observer side.

To achieve the above object, a liquid crystal display device according to a first aspect of the present invention comprises:

a pair of substrates disposed to face each other having a predetermined gap therebetween;

a plurality of pixel electrodes formed on an internal surface of one substrate of facing internal surfaces of the pair of substrates, and arranged in a row direction and a column direction in a matrix;

a plurality of thin film transistors formed on the internal surface of the one substrate and connected to the plurality of pixel electrodes respectively;

a plurality of gate lines and data lines formed on the internal surface of the one substrate, for respectively supplying a gate signal and a data signal to the plurality of thin film transistors;

at least one opposing electrode formed on the internal surface of the other substrate, whose regions, which face the plurality of pixel electrodes respectively, define a plurality of pixels arranged in the row direction and the column direction;

a reflective layer formed on the internal surface of the substrate, of the pair of substrates, that is at an opposite side to an observer side, for forming, in each of the plurality of pixels, a reflective display region for reflecting light that enters from the observer side to the observer side, and a transmissive display region for allowing light that enters from the opposite side to pass therethrough to the observer side;

homeotropic alignment films formed on the internal surfaces of the pair of substrates respectively, so as to cover the electrode(s);

a liquid crystal layer having negative dielectric anisotropy, sealed in a gap between the homeotropic alignment films on the pair of substrates; and a liquid crystal layer thickness adjusting layer formed on the internal surface of either of the pair of substrates, for setting a liquid crystal layer thickness in the reflective display region in each of the plurality of pixels to be smaller than a liquid crystal layer thickness in the transmissive display region.

Since the liquid crystal display device according to the first aspect is of a homeotropic alignment type and provides each of the plurality of pixel electrodes with a reflective layer for forming a reflective display region for reflecting light that enters from the observer side to the observer side and a transmissive display region for allowing light that enters from the opposite side to pass therethrough to the observer side, and the liquid crystal layer thickness adjusting layer for setting the liquid crystal layer thickness in the reflective display region to be smaller than the liquid crystal layer thickness in the transmissive display region, the liquid crystal display device can perform reflective display using external light that enters from the observer side, and transmissive display using light that enters from the opposite side to the observer side.

In the present liquid crystal display device, it is preferred that the liquid crystal layer thickness adjusting layer be formed to have a thickness which sets the liquid crystal layer thickness in the reflective display region in each of the plurality of pixels to be substantially ½ of the liquid crystal layer thickness in the transmissive display region. Further, it is preferred that the liquid crystal layer thickness adjusting layer be made of a transparent film which is formed on the internal surface of either of the pair of substrates so as to correspond to the reflective display region of each of the plurality of pixels.

It is preferred that the present liquid crystal display device further comprise color filters having three colors of red, green, and blue, which are formed on the internal surface of either of the pair of substrates so as to correspond to the plurality of pixels respectively, and that a non-coloring portion for allowing light to pass through the color filters without being colored be formed in the color filters at a portion corresponding to a predetermined region of the reflective display region. In this case, it is preferred that the non-coloring portion of the color filters be formed by removing a portion of the color filters, and the liquid crystal layer thickness adjusting layer made of a colorless transparent film be formed on the color filters so as to fill the removed portion of the color filters.

It is preferred that the present liquid crystal display device further comprise an auxiliary electrode formed on the internal surface of the one substrate along a circumference of each of the plurality of pixel electrodes, so as to face the opposing electrode on the other substrate for generating an electric field having a predetermined value between itself and the opposing electrode. In this case, it is preferred that the auxiliary electrode be set to substantially a same potential as a potential of the opposing electrode. Further, it is preferred that the auxiliary electrode have edges that are overlaid with the circumference of the pixel electrode via an insulating layer, and these edges function as a capacitor electrode for forming a compensating capacitor between the auxiliary electrode and the pixel electrode. Furthermore, it is preferred that the auxiliary electrode be made of a layered film including a low resistance metallic film formed on a region facing the opposing electrode, and a transparent conductive film formed to be overlaid on the low resistance metallic film for at least forming the edges that are overlaid with the pixel electrode.

Further, it is preferred that the plurality of pixel electrodes each have a slit that divides the pixel electrode into a plurality of electrode portions. In this case, it is preferred that the plurality of pixel electrodes be each formed into an elongate shape having an electrode width in the row direction and an electrode length in the column direction which is substantially an integer multiple of the electrode width, and be each divided into the plurality of electrode portions having substantially a square shape and arrayed in a direction of the electrode length, by the slit formed in parallel with a direction of the electrode width. In this case, it is preferred that the liquid crystal display device further comprise an auxiliary electrode which has a shape formed by a frame-like portion that surrounds a circumference of each pixel electrode and a linear portion that corresponds to the slit of the pixel electrode, and which is formed on the internal surface of the one substrate along a circumference of each of the plurality of electrode portions constituting each of the plurality of pixel electrodes, so as to face the opposing electrode on the other substrate for generating an electric field having a predetermined value between itself and the opposing electrode. Further, it is preferred that the reflective layer that divides each of the plurality of pixels into the reflective display region and the transmissive display region be made of a reflective film formed for each of the plurality of pixel electrodes so as to correspond to a predetermined electrode portion of the plurality of electrode portions separated by the slit, and the reflective display region be formed by a region corresponding to the electrode portion for which the reflective film is provided while the transmissive display region be formed by a region corresponding to the other electrode portion.

In the present liquid crystal display device, it is further preferred that a projection be formed on the internal surface of the other substrate on which the opposing electrode is formed, so as to correspond to a center of at least one electrode portion of the plurality of electrode portions separated by the slit of each of the plurality of pixel electrodes. In this case, it is preferred that the projection be formed into a shape whose cross sectional shape parallel with a surface of the substrates is circular and whose diameter decreases toward a projection end. It is further preferred that the projection be formed to correspond to the center of the electrode portion which forms the transmissive display region, of the plurality of electrode portions formed by dividing each of the plurality of pixel electrodes by the slit.

A liquid crystal display device according to a second aspect of the present invention comprises:

a pair of substrates disposed so as to face each other having a predetermined gap therebetween;

a plurality of pixel electrodes formed on an internal surface of one substrate of facing internal surfaces of the pair of substrates so as to be arranged in a row direction and a column direction in a matrix, and each having at least one slit that divides the pixel electrode into a plurality of electrode portions;

a plurality of thin film transistors formed on the internal surface of the one substrate and connected to the plurality of pixel electrodes respectively;

a plurality of gate lines and data lines formed on the internal surface of the one substrate, for respectively supplying a gate signal and a data signal to the plurality of thin film transistors;

at least one opposing electrode formed on the internal surface of the other substrate, whose regions, which face the plurality of pixel electrodes respectively, define a plurality of pixels arranged in the row direction and the column direction;

a reflective layer formed on the internal surface of the substrate, of the pair of substrates, that is at an opposite side to an observer side, so as to correspond to at least one electrode portion of the plurality of electrode portions formed by dividing each of the plurality of pixel electrodes, such that the at least one electrode portion forms a reflective display region for reflecting light that enters from the observer side to the observer side, and the other electrode portion(s) form(s) a transmissive display region for allowing light that enters from the opposite side to pass therethrough to the observer side;

homeotropic alignment films formed on the internal surfaces of the pair of substrates respectively, so s to cover the electrode(s); and a liquid crystal layer having negative dielectric anisotropy, sealed in a gap between the homeotropic alignment films on the pair of substrates.

Since the liquid crystal display device according to the second aspect is of a homeotropic alignment type and has each of the plurality of pixel electrodes divided by the slit into a plurality of pixel electrode portions and has the reflective layer formed correspondingly to at least one of these electrode portions such that the one electrode portion forms the reflective display region for reflecting light that enters from the observer side to the observer side, and the other electrode portion(s) form(s) the transmissive display region for allowing light that enters from the opposite side to pass therethrough to the observer side, the liquid crystal display device can display an image having a fine quality, by reflective display using external light that enters from the observer side, and by transmissive display using light that enters from the opposite side to the observer side.

In the present liquid crystal display device, it is preferred that each of the plurality of pixel electrodes be formed into an elongate shape having an electrode width in the row direction and an electrode length in the column direction which is substantially an integer multiple of the electrode width, and be divided into the plurality of electrode portions having substantially a square shape and arrayed in a direction of the electrode length, by the slit formed in parallel with a direction of the electrode width, and the liquid crystal display device further comprise a liquid crystal layer thickness adjusting layer which is formed on the internal surface of either of the pair of substrates so as to correspond to a pixel region for forming the reflective display region in each of the plurality of pixels, for setting a liquid crystal layer thickness in the reflective display region to be smaller than a liquid crystal layer thickness in the transmissive display region. Further, it is preferred that the liquid crystal display device further comprise an auxiliary electrode which is formed into a shape defined by a frame-like portion that surrounds each pixel electrode and a linear portion that corresponds to the slit of the pixel electrode and formed along a circumference of each of the plurality of electrode portions formed by dividing each pixel electrode, and which is set to substantially a same potential as a potential of the opposing electrode.

A liquid crystal display device according to a third aspect of the present invention comprises:

a pair of substrates disposed to face each other having a predetermined gap therebetween;

a plurality of pixel electrodes formed on an internal surface of one substrate of facing internal surfaces of the pair of substrates so as to be arranged in a row direction and a column direction in a matrix, and having at least one slit that divides each pixel electrode into a plurality of electrode portions;

a plurality of thin film transistors formed on the internal surface of the one substrate and connected to the plurality of pixel electrodes respectively;

a plurality of gate lines and data lines formed on the internal surface of the one substrate, for respectively supplying a gate signal and a data signal to the plurality of thin film transistors;

at least one opposing electrode formed on the internal surface of the other substrate, whose regions, which face the plurality of pixel electrodes respectively, define a plurality of pixels arranged in the row direction and the column direction;

a reflective layer formed on the internal surface of the substrate, of the pair of substrates, that is at an opposite side to an observer side, so as to correspond to at least one electrode portion of the plurality of electrode portions formed by dividing each of the plurality of pixel electrodes, such that the at least one electrode portion forms a reflective display region for reflecting light that enters from the observer side to the observer side, and the other electrode portion(s) form(s) a transmissive display region for allowing light that enters from the opposite side to pass therethrough to the observer side;

a projection formed on the internal surface of the other substrate on which the opposing electrode is formed, so as to correspond to a center of at least one electrode portion which forms the transmissive display region, of the plurality of electrode portions formed by dividing each pixel electrode;

homeotropic alignment films formed on the internal surfaces of the pair of substrates respectively, to cover the electrode(s); and a liquid crystal layer having negative dielectric anisotropy, sealed in a gap between the homeotropic alignment films on the pair of substrates.

Since the liquid crystal display device according to the third aspect is of a homeotropic alignment type which has each of the plurality of pixel electrodes divided by the slit into a plurality of electrode portions such that the reflective layer is formed correspondingly to at least one of these electrode portions to form the reflective display region for reflecting light that enters from the observer side to the observer side and the other electrode portion(s) form(s) the transmissive display region for allowing light that enters from the opposite side to pass therethrough to the observer side, and has the projection formed correspondingly to the center of at least one electrode portion that forms the transmissive display region, the liquid crystal display device can stabilize the alignment state of the liquid crystal molecules in each electrode portion and can display an image having a fine quality by reflective display using external light that enters from the observer side and by transmissive display using light that enters from the opposite side to the observer side.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

First Embodiment

Figure 1:
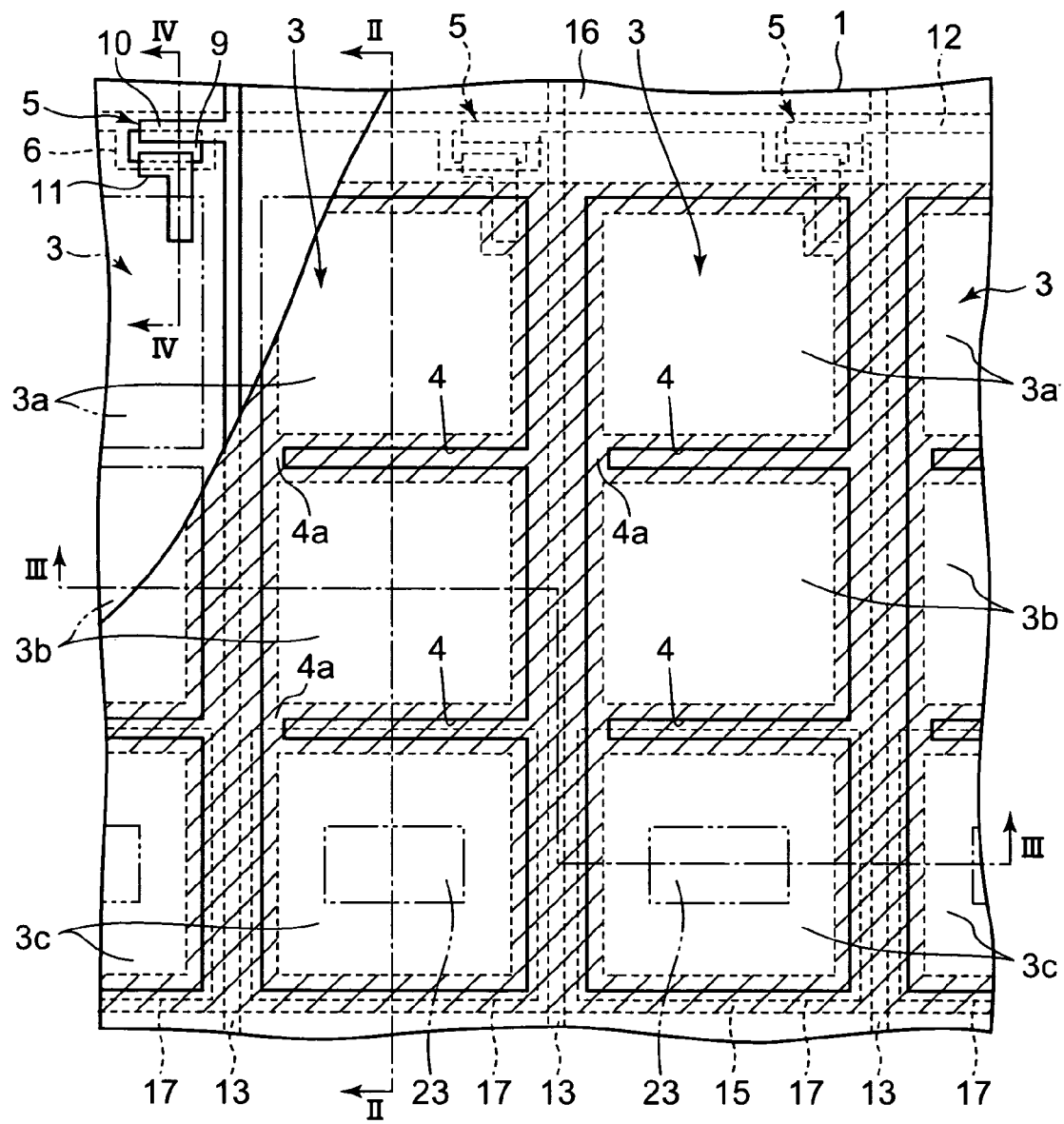
FIG. 1 is a plan view showing a part of a liquid crystal display device showing a first embodiment of the present invention.
Figure 2:
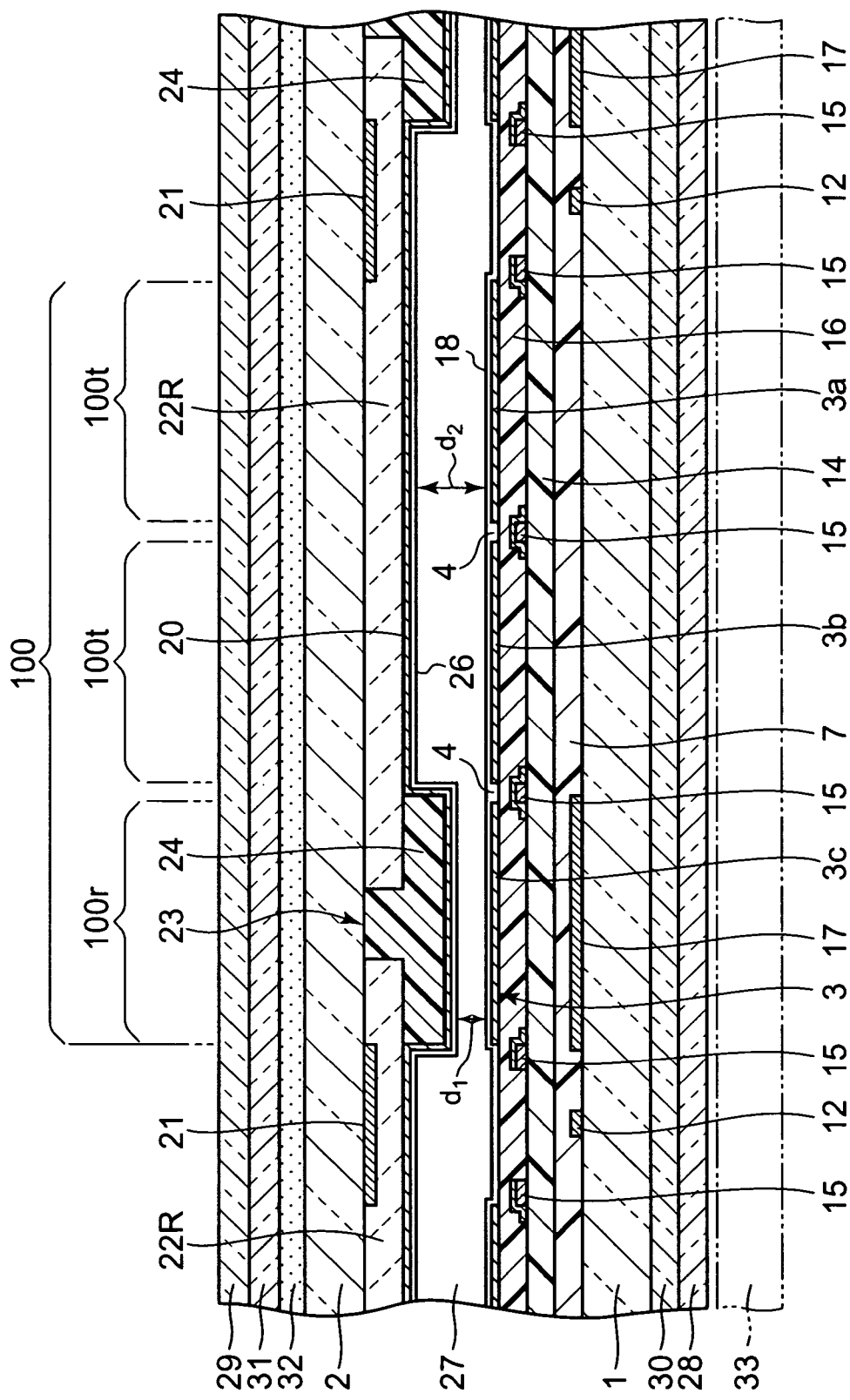
FIG. 2 is a cross sectional view showing the liquid crystal display device according to the first embodiment as sectioned along a II-II line of FIG. 1.
Figure 3:
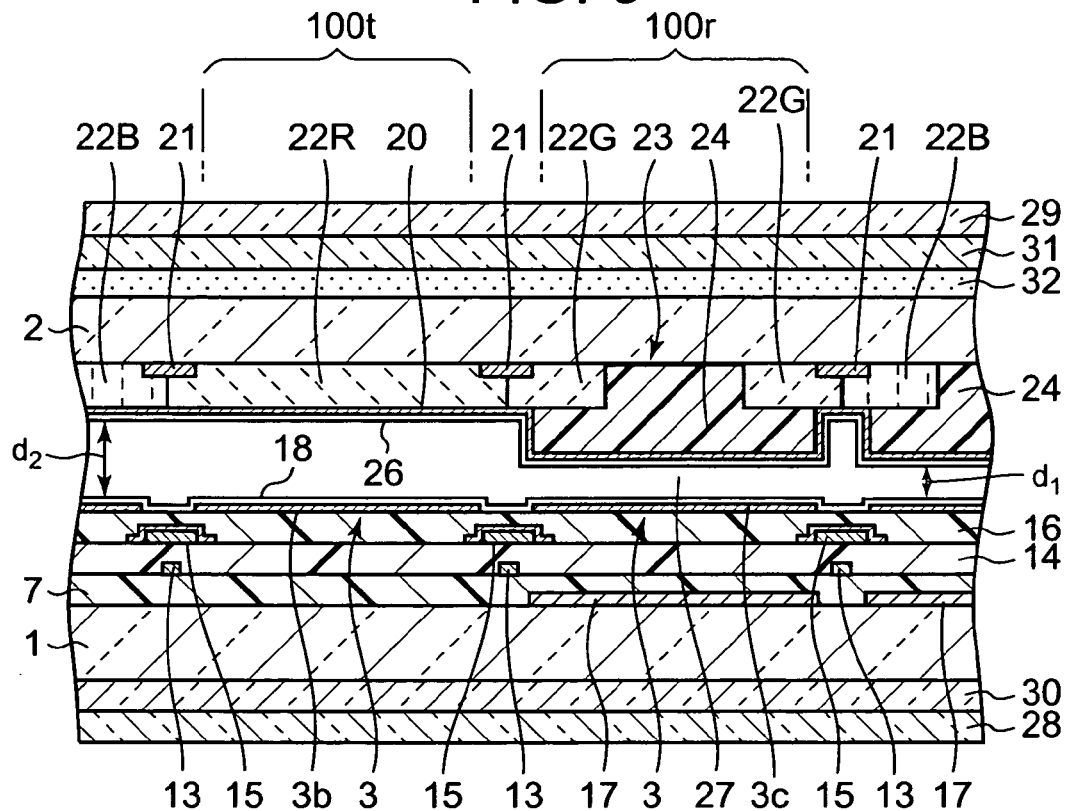
FIG. 3 is a cross sectional view as sectioned along a III-III line of FIG. 1.
Figure 4:
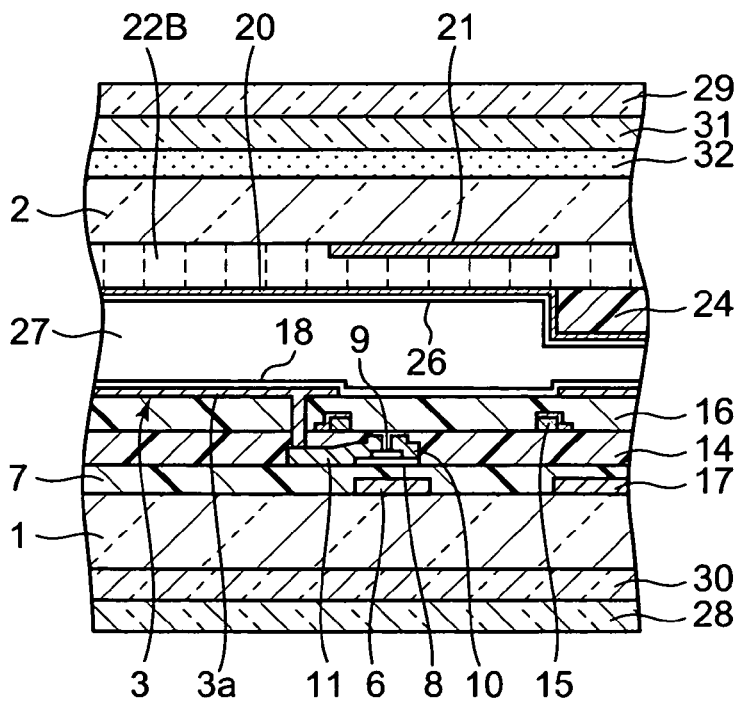
FIG. 4 is a cross sectional view as sectioned along a IV-IV line of FIG. 1.
Figure 5:
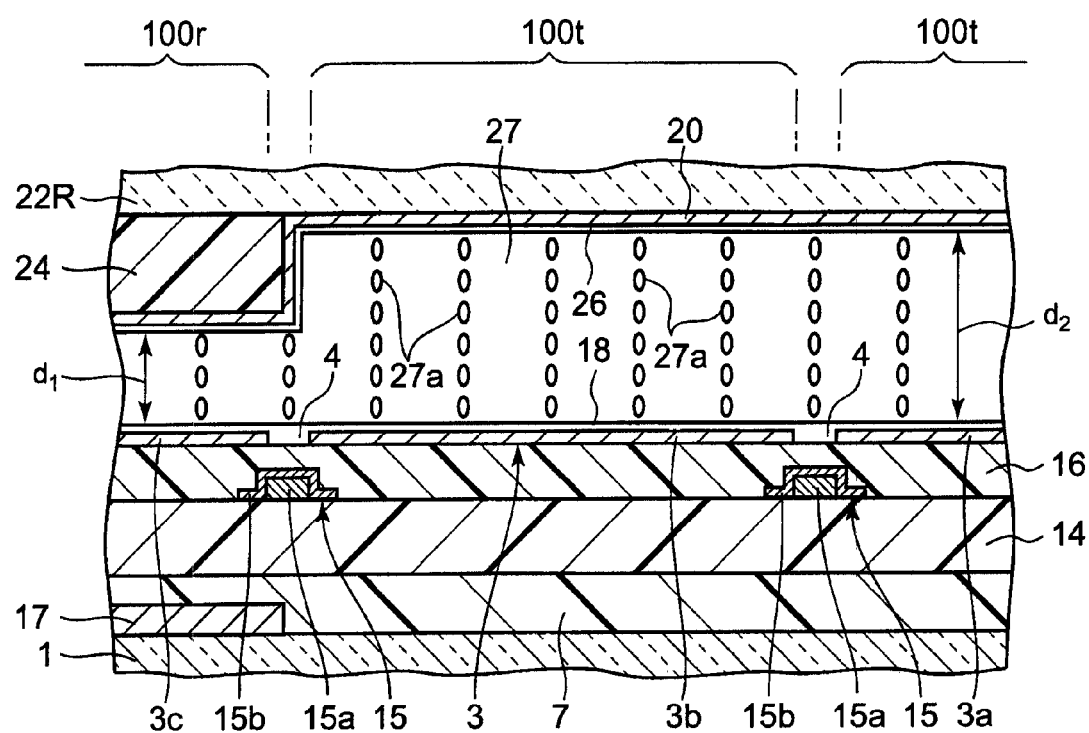
FIG. 5 is an expanded cross sectional view showing a part of FIG. 2 in expansion.

FIGS. 1 to 5 show the first embodiment of the present invention, where FIG. 1 is a plan view of a part of a liquid crystal display device, FIGS. 2, 3, and 4 are cross sectional views as taken along a II-II line, a III-III line, and a IV-IV line of FIG. 1 respectively, and FIG. 5 is an expanded cross sectional view showing a part of FIG. 2 in expansion.

The present liquid crystal display device is a homeotropic alignment type active matrix liquid crystal display device, and comprises a pair of transparent substrates 1 and 2 arranged to face each other with a predetermined gap therebetween, and a liquid crystal layer 27 having negative dielectric anisotropy sealed in the gap between the pair of substrates 1 and 2, as shown in FIGS. 1 to 5. Of the facing internal surfaces of the pair of substrates 1 and 2, the internal surface of one substrate, for example, the internal surface of the substrate (hereinafter referred to as rear substrate) 1 at the opposite side to the observer side (the upper side in FIGS. 2 to 4) is provided thereon with pixel electrodes 3, a plurality of TFTs 5, a plurality of gate lines 12, and a plurality of data lines 13. The plurality of transparent pixel electrodes 3 are provided so as to be arranged in the row direction (the left and right direction in FIG. 1) and in the column direction (the up and down direction in FIG. 1) to form a matrix. The plurality of TFTs 5 are connected to the plurality of pixel electrodes 3 respectively. The plurality of gate lines 12 are formed to be in parallel with the rows of pixel electrodes 3 respectively, for supplying a gate signal to the TFTs 5. The plurality of data lines 13 are formed to be in parallel with the columns of pixel electrodes 3 respectively, for supplying a data signal to the TFTs 5. The internal surface of the other substrate, i.e., the substrate (hereinafter referred to as front substrate) 2 at the observer side, is provided thereon with a monolithic transparent opposing electrode 20, which forms a plurality of pixels 100 in the regions in which the opposing electrode 20 faces the plurality of pixel electrodes 3 respectively. The internal surface of the rear substrate 1 is further provided thereon with a reflective layer 17, which divides each of the plurality of pixels 100 into a reflective display region 100r for reflecting light that enters from the observer side to the observer side, and a transmissive display region 100t for allowing light that enters from the opposite side to pass therethrough to the observer side. A homeotropic alignment film 18 is formed on the internal surface of the substrate 1 to cover the pixel electrodes 3, and a homeotropic alignment film 26 is formed on the internal surface of the substrate 2 to cover the opposing electrode 20. The internal surface of either of the pair of substrates 1 and 2, for example, the internal surface of the front substrate 2 has a liquid crystal layer thickness adjusting layer 24 formed thereon, which is for setting the liquid crystal layer thickness $d_1$ in the reflective display region 100r of each of the plurality of pixels 100 to be smaller than the liquid crystal layer thickness $d_2$ in the transmissive display region 100t.

As shown in FIGS. 1 and 4, the TFT 5 comprises a gate electrode 6 formed on the substrate surface of the rear substrate 1, a transparent gate insulating film 7 formed to cover the gate electrode 6 over the entire region where the pixel electrodes 3 are arranged, an i type semiconductor film 8 formed on the gate insulating film 7 to face the gate electrode 6, a blocking insulating film 9 formed on the center part of the i type semiconductor film 8 where the channel region is formed, and a drain electrode 10 and a source electrode 11 formed on one end portion and the other end portion of the i type semiconductor film 8 via an n type semiconductor film (unillustrated).

The gate line 12 is formed on the substrate surface of the rear substrate 1 integrally with the gate electrode 6 of the TFT 5, and the data line 13 is formed on the gate insulating film 7 integrally with the drain electrode 10 of the TFT 5.

The rear substrate 1 is further provided, on its internal surface, with a transparent flattening insulating film 14 which covers the plurality of TFTs 5, and a transparent overcoat insulating film 16 formed on the flattening insulating film 14, such that both the flattening insulating film 14 and the overcoat insulating film 16 are spread over the entire region where the pixel electrodes 3 are arranged. The plurality of pixel electrodes 3 are formed on the overcoat insulating film 16, and connected to the source electrode 11 of the TFTs 5 corresponding to the pixel electrodes 3 respectively, through a contact hole formed in the overcoat insulating film 16 and flattening insulating film 14. In FIG. 1, the overcoat insulating film 16 and the homeotropic alignment film 18 on the internal surface of the rear substrate 1 are omitted.

The plurality of pixel electrodes 3 are formed in an elongate shape where the electrode width in the row direction is smaller than the electrode length in the column direction. Each of these pixel electrodes 3 has slits 4, which divides the pixel electrode 3 into a plurality of electrode portions each have substantially a square shape.

In the present liquid crystal display device, each of the pixel electrodes 3 is formed into an elongate shape whose electrode length in the column direction is substantially an integer multiple, for example, the triple of the electrode width in the row direction. Each of these pixel electrodes 3 is provided with two slits 4 parallel with the electrode width in the row direction, at intervals substantially equal to the electrode width in the row direction. Thus, each pixel electrode 3 is divided into electrode portions 3a, 3b, and 3c having a square shape and arrayed in the direction of length of the pixel electrode 3.

Each slit 4 extends from one side edge of the pixel electrode 3 in the widthwise direction, for example, one side edge at which the TFT 5 is arranged, toward the other side edge at the opposite side (the left side in FIG. 1), up to the position apart from the other side edge by a distance similar to the width of the slit. Therefore, the plurality of electrode portions 3a, 3b, and 3c separated by the slits 4 are linked to each other by a continuing portion 4a in the region along the other side edge of the pixel electrode 3, between the end of the slits 4 and the other side edge.

Each slit 4 is formed to have a width equal to or smaller than, for example, 4.0 μm. The width of the continuing portion 4a between the electrodes portions 3a and 3b and between the electrode portions 3b and 3c, which adjoin each other sandwiching the slit 4 therebetween (the width of the continuing portion 4a being the distance between the other side edge of the pixel electrode 3 and the end of the slit 4) is equal to or smaller than 13/100 of the electrode width of the electrode portions 3a, 3b, and 3c in the direction parallel with the slit 4, and is set to such a value as would not let the electric resistance value of the continuing portion 4a exceed the range of tolerance.

The pixel electrode 3 is connected to the source electrode 11 of the TFT 5 at one corner of the electrode portion 3a positioned at one end in the column direction, among the plurality of electrode portions 3a, 3b, and 3c.

Each reflective layer 17, which divides each of the plurality of pixels 100 into the reflective display region 100r and the transmissive display region 100t, is made of a metallic reflective film, which is formed on the substrate surface of the rear substrate 1, at a position corresponding to a predetermined region of each of the plurality of pixel electrodes 3. Hereinafter, the reflective layer 17 will be referred to as reflective film.

According to the present embodiment, for each of the plurality of pixel electrodes 3, the reflective film 17 is formed to meet the entire region of a predetermined electrode portion among the plurality of electrode portions 3a, 3b, and 3c separated by the slits 4, for example, the electrode portion 3c positioned at the other side to the side of TFT 5. Therefore, the region corresponding to the predetermined electrode portion 3c forms the reflective display region 100r, and the regions corresponding to the other two electrode portions 3a and 3b form the transmissive display regions 100t.

Further, an auxiliary electrode 15 is formed on the internal surface of the rear substrate 1, along the circumference of each of the plurality of pixel electrodes 3, so as to face the opposing electrode 20 on the front substrate 2, in order to form an electric field having a predetermined value between itself and the opposing electrode 20. In FIG. 1, in order to make the auxiliary electrode 15 identifiable, parallel slant lines are applied to the portions of the auxiliary electrode 15.

The auxiliary electrode 15 is formed on the flattening insulating film 14, which is formed to cover the TFTs 5, and is covered by the overcoat insulating film 16.

According to the present embodiment, the auxiliary electrode 15 is formed into a shape having a frame-like portion which surrounds the pixel electrode 3, and linear portions corresponding to the slits 4 of the pixel electrode 3, such that the auxiliary electrode 15 is formed along the circumference of each of the plurality of electrode portions 3a, 3b, and 3c of the pixel electrode 3.

In each pixel electrode row, the auxiliary electrodes 15 corresponding to the pixel electrodes 3 in that row are continuous with each other. According to the present embodiment, as shown in FIGS. 1 and 3, the joining portion of the auxiliary electrodes 15 corresponding to the pixel electrodes 3 in each row (the joining portion being the portion corresponding to the region between adjoining pixel electrodes 3) is formed to have the same width as the auxiliary electrodes 15, but may be formed to have a width smaller than the auxiliary electrodes 15 or a width larger than the auxiliary electrodes 15, or the auxiliary electrodes 15 may be joined at a plurality of joining portions. As shown in FIG. 5, the auxiliary electrode 15 is made of a layered film, which includes a low resistance metallic film 15a formed on the regions other than the regions above which the electrode portions 3a, 3b, and 3c of the pixel electrode 3 are overlaid, and a transparent conductive film 15b formed on a region in which the edges of the film 15b overlaps with the electrode portions 3a, 3b, and 3c, such that the film 15b is overlaid on the low resistance metallic film 15a. According to the present embodiment, the low resistance metallic film 15a is formed on the flattening insulating film 14, and the transparent conductive film 15b is formed on the low resistance metallic film 15a to have a width that extends down from the low resistance metallic film 15a over the flattening insulating film 14. However, the transparent conductive film 15b may be formed on the flattening insulating film 14, and the low resistance metallic film 15a may be formed on the transparent conductive film 15b.

The auxiliary electrode 15 also serves as capacitor electrode for forming a compensating capacitance between itself and the pixel electrode 3. Specifically, the frame-like portion of the auxiliary electrode 15 that surrounds the entire circumference of the pixel electrode 3, and the linear portions of the auxiliary electrode 15 that correspond to the slits 4 of the pixel electrode 3 are formed to each have a shape whose edges face and are overlaid with the circumferences of the electrode portions 3a, 3b, and 3c of the pixel electrode 3. And the parts of the edges of the frame-like portion and linear portions of the auxiliary electrode 15, that are overlaid with the circumferences of the electrode portions 3a, 3b, and 3c of the pixel electrode 3, constitute the capacitor electrode portions for forming a compensating capacitance for inducing electricity in the overcoat insulating film 16. Further, the regions of the frame-like portion of the auxiliary electrode 15, that are spread outside the pixel electrode 3, and the regions of the linear portions of the auxiliary electrode 15, that correspond to the inside of the slits 4, face the opposing electrode 20 to form the auxiliary electrode portions for generating an electric field having a predetermined value between themselves and the opposing electrode 20. The homeotropic alignment film 18 on the internal surface of the rear substrate 1 is formed over the entire region where the plurality of pixel electrodes 3 are arranged, so as to cover the pixel electrodes 3.

On the other hand, the front substrate 2 has, on its internal surface, a lattice-shaped black mask 21 made of a light shielding film (for example, a layered film including a chromium film and a chromium oxide film). Further, color filters 22R, 22G, and 22B having three colors of red, green, and blue are formed on the internal surface of either of the pair of substrates 1 and 2, so as to correspond to the entire region of each of the plurality of pixels 100 respectively.

According to the present embodiment, the color filters 22R, 22G, and 22B of three colors of red, green, and blue are formed on the internal surface of the front substrate 2 so as to cover the black mask 21. The liquid crystal layer thickness adjusting layer 24 for setting the liquid crystal layer thickness $d_1$ in the reflective display region 100r of each of the plurality of pixels 100 to be smaller than the liquid crystal layer thickness $d_2$ in the transmissive display regions 100t, is formed on the color filters.

The liquid crystal layer thickness adjusting layer 24 is formed of a transparent film made of photosensitive resin or the like, which is formed so as to correspond to the reflective display region 100r of each of the plurality of pixels 100.

The liquid crystal layer thickness adjusting layer 24 is formed to have a thickness, which is approximately ½ of the liquid crystal layer thickness $d_2$ in the transmissive display regions 100t of each of the pixels 100, and sets the liquid crystal layer thickness $d_1$ in the reflective display region 100r of each of the plurality of pixels 100 to be substantially ½ of the liquid crystal layer thickness $d_2$ in the transmissive display regions 100t.

According to the present embodiment, the color filters 22R, 22G, and 22B of three colors of red, green, and blue each have a non-coloring portion 23, which allows light to pass through the color filter without being colored, at a portion corresponding to a predetermined region of the reflective display region 100r, for example, at a portion corresponding to the center part of the reflective display region 100r.

The non-coloring portion 23 of the color filters 22R, 22G, and 22B is formed by partially removing the color filters 22R, 22G, and 22B. The liquid crystal layer thickness adjusting layer 24 made of a colorless transparent film is formed on the color filers 22R, 22G, and 22B so as to fill the removed portion of the color filters 22R, 22G, and 22B.

The opposing electrode 20 is formed on the color filters 22R, 22G, and 22B and the liquid crystal layer thickness adjusting layer 24, and the homeotropic alignment film 26 on the internal surface of the front substrate 2 is formed over the entire region where the pixel electrodes 3 are arranged, so as to cover the opposing electrode 20.

The rear substrate 1 and the front substrate 2 are joined to each other via an unillustrated frame-like sealing member which surrounds the region where the plurality of pixel electrodes 3 are arranged.

The rear substrate 1 has led-out portions (unillustrated), which are formed at one end in the row direction and at one end in the column direction respectively, so as to protrude to the outside of the front substrate 2. The plurality of gate lines 12 are connected to a plurality of gate driver connecting terminals formed on the led-out portion in the row direction. The plurality of data lines 13 are connected to a plurality of data driver connecting terminals formed on the led-out portion in the column direction.

Though not illustrated, an opposing electrode connecting wire is formed on the internal surface of the rear substrate 1, so as to be led out from a connecting electrode disposed about the corner where the substrates are joined by the sealing member, to one or both of the led-out portions in the row direction and in the column direction. The opposing electrode connecting wire is connected to an opposing electrode terminal arranged adjacent the driver connecting terminals. The internal surface of the front substrate 2 has an extending portion that extends to the position corresponding to the connecting electrode on the rear substrate 1, and this extending portion is electrically connected to the connecting electrode. In this manner, the opposing electrode 20 is connected to the opposing electrode terminal through the opposing electrode connecting wire.

The auxiliary electrodes 15 in each row on the internal surface of the rear substrate 1 are connected in common to an unillustrated auxiliary electrode connecting wire(s) arranged in parallel with the data line 13, outside the region where the pixel electrodes 3 are arranged, at one end or both ends of this region. The auxiliary electrode connecting wire(s) is/are led out to one or both of the led-out portions in the row direction and in the column direction, and connected to an auxiliary electrode terminal arranged adjacent to the driver connecting terminals.

The auxiliary electrode terminal is a terminal identical with the opposing electrode terminal, or a terminal connected at the same potential as the connecting potential of the opposing electrode terminal. Accordingly, the potential of the plurality of auxiliary electrodes 15 is set to substantially the same value as the potential of the opposing electrode 20.

The liquid crystal layer 27 is sealed in the region enclosed by the sealing member between the rear substrate 1 and the front substrate 2. The liquid crystal molecules 27a of the liquid crystal layer 27 are aligned substantially perpendicularly to the surfaces of the substrates 1 and 2, due to the homeotropic alignment setting force of the homeotropic alignment films 18 and 26 formed on the internal surfaces of the pair of substrates 1 and 2 respectively.

A rear polarizing plate 28 is formed on the external surface of the rear substrate 1, and a front polarizing plate 29 is formed on the external surface of the front substrate 2. The rear polarizing plate 28 and front polarizing plate 29 are arranged so as to make their transmissive axes substantially orthogonal to each other, or to make their transmissive axes substantially parallel with each other.

Further, a retardation plate 30 is disposed between the rear substrate 1 and the rear polarizing plate 28, and a retardation plate 31 is disposed between the front substrate 2 and the front polarizing plate 29. The retardation plates 30 and 31 are each for improving the contrast and/or the view angle characteristic of the display. A diffusing layer 32 is formed between the front substrate 2 and the front retardation plate 31, for eliminating the glitter on the display due to the external light (external ambient light), that enters from the front side of the liquid crystal display device, i.e., the observer side, being superficially reflected on the external surface of the front substrate 2. The diffusion layer 32 is made of an adhesive agent layer in which light scattering particles are mixed, and the front retardation plate 31 is adhered to the external surface of the front substrate 2 by the diffusing-layer 32. The front retardation plate 31 and the front polarizing plate 29, the rear substrate 1 and the rear retardation plate 30, and the rear retardation plate 30 and the rear polarizing plate 28 are adhered to each other by an unillustrated non-diffusive both-face adhesive film respectively.

The present liquid crystal display device is of a homeotropic alignment type, in which the homeotropic alignment film 18 is formed on the internal surface of the rear substrate 1 on which the plurality of pixel electrodes 3, TFTs 5, gate lines 12, and data line 13 are formed, so as to cover the pixel electrodes 3 while the homeotropic alignment film 26 is formed on the internal surface of the front substrate 2 on which the opposing electrode 20 is formed, so as to cover the opposing electrode 20, and the liquid crystal layer 27 having negative dielectric anisotropy is sealed in the gap between the homeotropic alignment films 18 and 26 on the pair of substrate 1 and 2. Further, the present liquid crystal display device displays an image by aligning the liquid crystal molecules 27a of the liquid crystal layer 27 to lie down from the homeotropic alignment state shown in FIG. 5, by applying a voltage across the pixel electrode 3 and the opposing electrode 20 in each of the plurality of pixels 100 defined by the regions where the plurality of pixel electrodes 3 and the opposing electrode 20 face each other.

The present liquid crystal display device is provided, on the internal surface of the rear substrate 1 at the opposite side to the observer side, of the pair of substrates 1 and 2, with the reflective film 17 which divides each of the plurality of pixels 100 into the reflective display region 100r for reflecting light that enters from the observer side to the observer side, and the transmissive display regions 100t for allowing light that enters from the opposite side to pass therethrough to the observer side. This enables the liquid crystal display device to perform reflective display which utilizes external light that enters from the observer side, by the reflective display regions 100r of the plurality of pixels 100, and to perform transmissive display which utilizes light that is emitted from a surface light source 33 disposed at the rear of the liquid crystal display device and enters from the opposite side to the observer side, by the transmissive display regions 100t of the plurality of pixels 100.

Further, the present liquid crystal display device comprises the liquid crystal layer thickness adjusting layer 24, which is formed on the internal surface of either of the pair of substrates 1 and 2, for example, the front substrate 2 at the observer side, for setting the liquid crystal layer thickness $d_1$ in the reflective display region 100r of each of the plurality of pixel electrodes 3 to be smaller than the liquid crystal layer thickness $d_2$ in the transmissive display regions 100t. This makes it possible to reduce the quality difference between the image displayed by the reflective display and the image displayed by the transmissive display, by reducing the difference between the birefringence effect given by the liquid crystal layer 27 in the reflective display region 100r onto the light that enters from the observer side and reciprocally passes through the liquid crystal layer 27 to be emitted to the observer side, and the birefringence effect given by the liquid crystal layer 27 in the transmissive display regions 100t onto the light that enters from the opposite side to the observer side and passes through the liquid crystal layer 27 unidirectionally to be emitted to the observer side.

According to the present embodiment, as described above, the liquid crystal layer thickness $d_1$ in the reflective display region 100r in each of the plurality of pixels 100 is set to be substantially ½ of the liquid crystal layer thickness $d_2$ in the transmissive display regions 100t. Accordingly, the product $\Delta n d_1$ of the refraction anisotropy $\Delta n$ of the liquid crystal in the reflective display region 100r and the liquid crystal layer thickness $d_1$ becomes substantially ½ of $\Delta n d_2$ of the transmissive display regions 100t, and the birefringence effect of the reflective display region 100r and that of the transmissive display regions 100t onto the light that passes through the liquid crystal layer 27 become therefore substantially equal to each other, making it possible to substantially eliminate the quality difference between the image displayed by the reflective display and the image displayed by the transmissive display.

Further, since the liquid crystal layer thickness adjusting layer 24 is formed in the present liquid crystal display device on the internal surface of either of the pair of substrates 1 and 2, for example, the front substrate 2, by using a transparent film provided correspondingly to the reflective display region 100r in each of the plurality of pixels 100, it is possible to set the liquid crystal layer thickness $d_1$ in the reflective display region 100r to be smaller than the liquid crystal layer thickness $d_2$ in the transmissive display regions 100t, with a simple structure.

Further, since the present liquid crystal display device is provided, on the internal surface of either of the pair of substrates 1 and 2, for example, the front substrate 2, with the color filters 22R, 22G, and 22B of three colors of red, green, and blue, which correspond to the entire region of any of the plurality of pixels 100 respectively, and the non-coloring portion 23 for allowing light to pass through the color filter without being colored is formed in the color filters 22R, 22G, and 22B at a portion corresponding to the predetermined region of the reflective display region 100r, a color image can be displayed by both the reflective display and the transmissive display. Further, in the reflective display, by letting colored light that is colored through the color filters 22R, 22G, and 22B and uncolored light that passes through the non-coloring portions 23 of the color filters 22R, 22G, and 22B be emitted from the reflective display regions 100r, it is possible to increase the luminance of the emitted light and display a color image with a sufficient brightness by the reflected light.

Further, since the present liquid crystal display device has, on the internal surface of the rear substrate 1, the auxiliary electrodes 15, which are formed along the circumference of the plurality of pixel electrodes 3 respectively, such that the auxiliary electrodes 15 face the opposing electrode 20 on the front substrate 2 for generating an electric field having a predetermined value between themselves and the opposing electrode 20, it is possible to align the liquid crystal molecules 27a in each pixel 100 to stably lie down toward the center of the pixel 100 from the circumference of the pixel 100 by application of a voltage across the pixel electrode 3 and the opposing electrode 20, and to display a fine quality image with no roughness, both by the reflective display and the transmissive display.

That is, the liquid crystal display device according to the present embodiment generates an electric field having a predetermined value, between the auxiliary electrode 15 formed along the circumference of the pixel electrode 3, and the opposing electrode 20. For example, according to the present embodiment, the auxiliary electrode 15 and the opposing electrode 20 are set to the same potential, so as not to allow an electric field to be generated between the auxiliary electrode 15 and the opposing electrode 20. Therefore, the liquid crystal display device can prevent generation of a traverse electric field (an electric field in the direction parallel with the substrate surface), which might be generated by the potential difference between the edges of the pixel electrode 3 and the gate lines 12 and data lines 13, and can therefore substantially eliminate the influences of the traverse electric field. Accordingly, the liquid crystal molecules 27a of each pixel 100 can be stably aligned to lie down toward the center of the pixel 100 from the circumference of the pixel 100.

As described above, in the liquid crystal display device according to the present embodiment, since the potential of the auxiliary electrode 15 and the potential of the opposing electrode 20 are set to substantially the same value as each other, the region between the auxiliary electrode 15 and the opposing electrode 20, i.e., the region around each pixel 100 has substantially no electric field generated to leave the liquid crystal molecules 27a in this region always aligned substantially perpendicularly to the surfaces of the substrates 1 and 2.

Further, since an equipotential distribution oriented toward the center of each pixel 100 is generated in the circumferential region of the pixel 100 by the application of a voltage across the pixel electrode 3 and the opposing electrode 20, the liquid crystal molecules 27a in the pixel 100 can be stably aligned to lie down toward the center of the pixel 100 from the circumference of the pixel 100, making it possible to display an image having a more favorable quality.

Further, since the present liquid crystal display device has the capacitor electrode function for forming a compensating capacitance between the auxiliary electrode 15 and the pixel electrode 3, the width of the region between adjoining pixels 100 can be made small to enable a sufficient aperture ratio to be achieved.

Furthermore, since the present liquid crystal display device has its auxiliary electrode 15 made of a layered film including the low resistance metallic film 15a which is formed on the region facing the opposing electrode 20, and the transparent conductive film 15b which forms the edges for forming a compensating capacitance by being overlaid with the pixel electrode 3, the liquid crystal display device can let out the light emitted from the reflective display region 100r and transmissive display regions 100t of the pixel 100, even from the circumferential region of the pixel 100 where the compensating capacitance is formed, making it possible to further increase the aperture ratio.

Further, since the present liquid crystal display device has each of the plurality of pixel electrodes 3 provided with the slits 4 that divides the pixel electrode 3 substantially into the plurality of electrode portions 3a, 3b, an 3c, the position of the alignment center in each of the electrode portions 3a, 3b, and 3c is stabilized to enable the liquid crystal molecules 27a in the respective regions corresponding to the electrode portions 3a, 3b, and 3c separated by the slits 3 of the pixel electrode 3 to lie down toward the center of the region from the respective circumferential edges of the region when voltage is applied across the pixel electrode 3 and the opposing electrode 20, resulting in a uniform alignment throughout the electrode portions 3a, 3b, and 3c to make it possible to display an image having a fine quality.

Moreover, since the present liquid crystal display device has each of its plurality of pixel electrodes 3 formed into an elongate shape whose electrode length in the column direction is substantially an integer multiple of the electrode width in the row direction and has the pixel electrodes 3 divided by the slits 4 provided in parallel with the widthwise direction into the plurality of electrode portions 3a, 3b, and 3c arrayed side by side in the direction of the electrode length of the pixel electrodes 3, the pixels 100 can be arrayed with a high density to make it possible to display an image having a high precision.

Further, according to the present embodiment, since the slits 4 are formed to have a width equal to or smaller than 4.0 μm as described above, only a very small area of the pixel electrode 3 is lost due to the provision of the slits 4, making it possible to obtain a sufficient aperture ratio.

Furthermore, according to the present embodiment, as described above, since the width of the continuing portion 4a between the electrode portions 3a and 3b and between the electrode portions 3b and 3c that adjoin each other sandwiching the slit 4 therebetween is set to equal to or smaller than $13/100$ of the width of the electrode portions 3a, 3b, and 3c in the direction parallel with the slits 4, the liquid crystal molecules 27a in each of the electrode portions 3a, 3b, and 3c can be aligned substantially independently in response to the voltage applied. That is, the liquid crystal molecules 27a in the respective regions corresponding to the electrode portions 3a and 3b and 3b and 3c which adjoin each other sandwiching the slit 4 are not to be aligned to lie down in the same direction by interfering with each other at the portion corresponding to the continuing portion 4a. Accordingly, the liquid crystal molecules 27a in each of the electrode portions 3a, 3b, and 3c can be stably aligned to lie down toward the center of the respective regions corresponding to the electrode portions 3a, 3b, and 3c, from the circumferential region of the regions when a voltage is applied across the pixel electrode 3 and the opposing electrode 20.

Further, according to the present embodiment, the width of the continuing portion 4a is set to such a value as would not make the electric resistance value of the continuing portion 4a exceed the range of tolerance, for example, 4.0 μm. Therefore, it is possible to apply a voltage having substantially the same value across the electrode portions 3a, 3b, and 3c, and the opposing electrode 20 respectively, by supplying a data signal given to one electrode portion 3a of the pixel electrode 3 from the data line 13 through the TFT 5 to also the other electrode portions 3b and 3c with almost no voltage drop caused. Accordingly, it is possible to control the liquid crystal molecules 27a in the respective regions corresponding to the electrode portions 3a, 3b, and 3c to substantially the same alignment state.

According to the present embodiment, the continuing portion 4a between the electrode portions 3a and 3b adjoining each other sandwiching one slit 4 of the two slits 4 and the continuing portion 4a between the electrode portions 3b and 3c adjoining each other sandwiching the other slit 4 are formed at the edge of the pixel electrode 3 at the same side. However, these continuing portions 4a may be formed at the center of the pixel electrode 3 in the widthwise direction. Alternatively, one continuing portion 4a may be formed at the side edge at the other side that is opposite to the side edge at one side where the TFT 5 of the pixel electrode 3 is formed, and the other continuing portion 4a may be formed at the side edge at the one side of the pixel electrode 3.

Further, since the present liquid crystal display device has the auxiliary electrode 15 formed into a shape having the frame-like portion that surrounds the entire circumference of the pixel electrode 3 and the linear portions that correspond to the slits 4 of the pixel electrode 3 such that the auxiliary electrode 15 is provided along all the circumferential edges of the plurality of electrode portions 3a, 3b, and 3c of the pixel electrode 3, the liquid crystal display device can more stably align the liquid crystal molecules 27a in each pixel 100 to lie down toward the center of the regions corresponding to the electrode portions 3a, 3b, and 3c respectively, from the all the circumferential edges of the regions, to make it possible to display an image having a higher quality.

Further, since the present liquid crystal display device has the reflective film 17 formed correspondingly to the entire region of a predetermined one of the plurality of electrode portions 3a, 3b, and 3c separated by the slits 4 in each of the plurality of pixel electrodes 3, for example, correspondingly to the entire region of the electrode portion 3c at the side opposite to the side of the TFT 5 such that the reflective display region 100r is formed by the region corresponding to the predetermined electrode portion 3c and the transmissive display regions 100t are formed by the regions corresponding to the other electrode portions 3a and 3b, the liquid crystal display device can stably align the liquid crystal molecules 27a in each pixel 100 to lie down in the reflective display region 100r and the transmissive display regions 100t region by region, making it possible to display an image having a favorable quality both in the reflective display and in the transmissive display.

Second Embodiment

Figure 6:
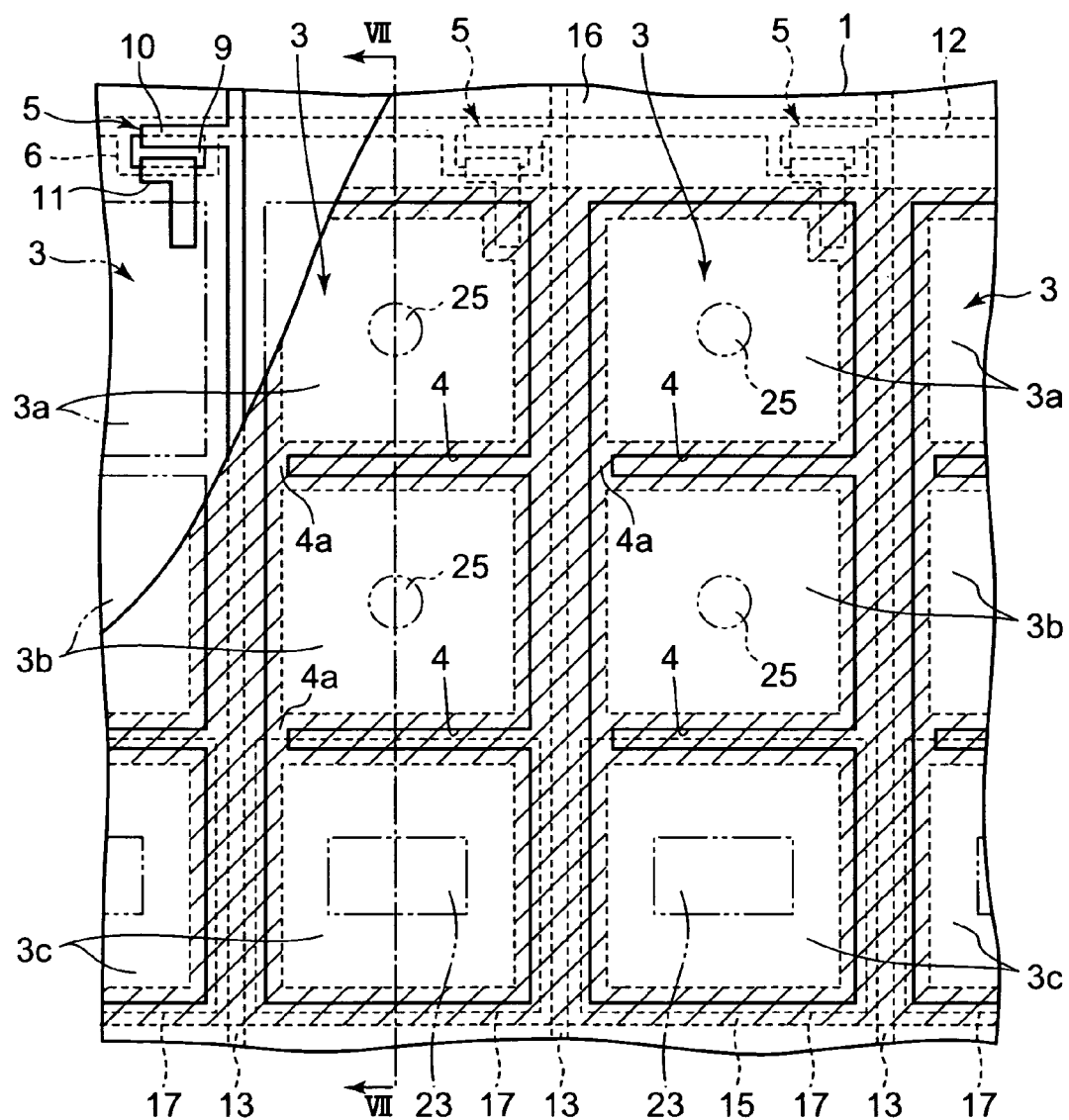
FIG. 6 is a plan view showing a part of a liquid crystal display device showing a second embodiment of the present invention.
Figure 7:
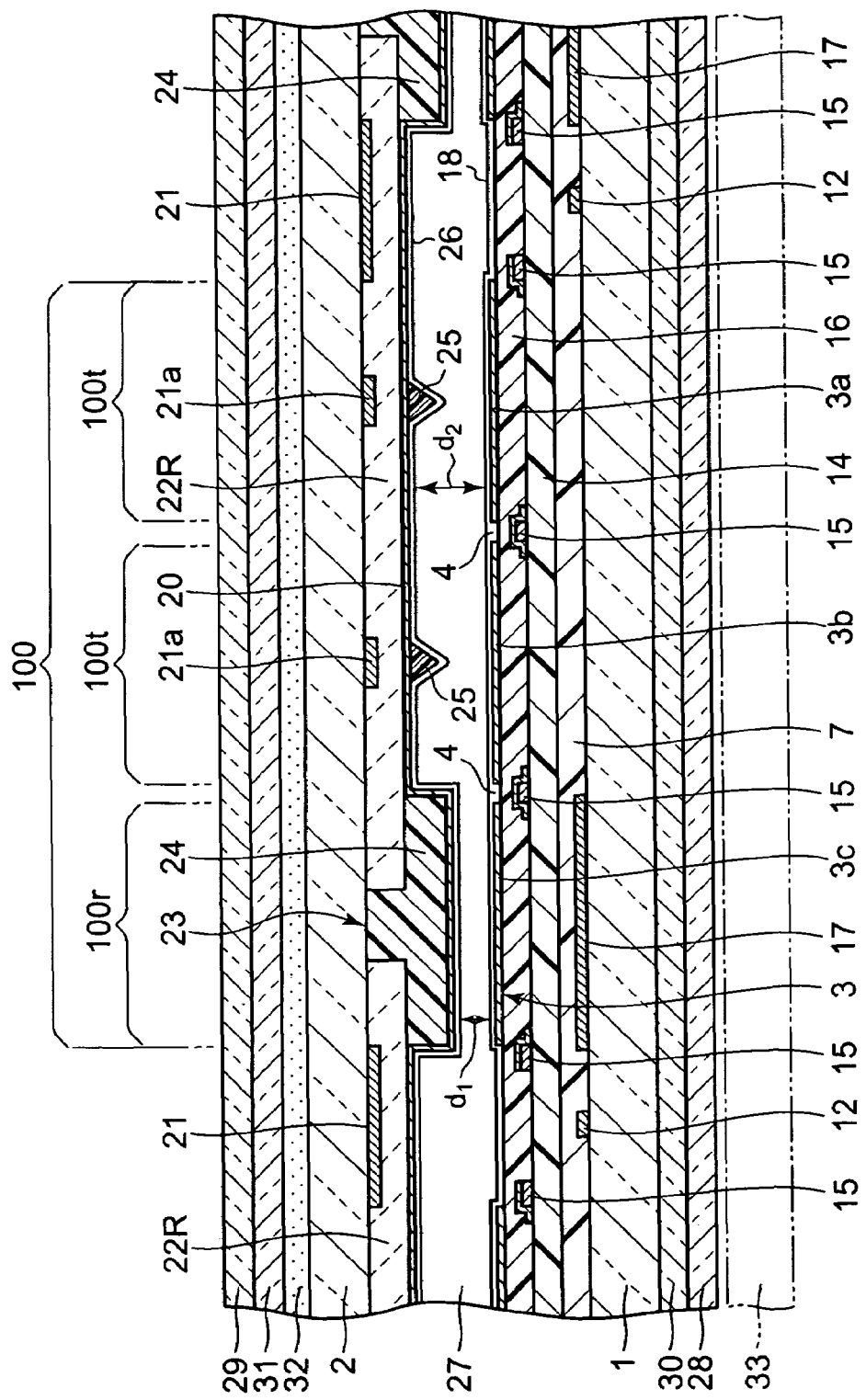
FIG. 7 is a cross sectional view as sectioned along a VII-VII line of FIG. 6.
Figure 8:
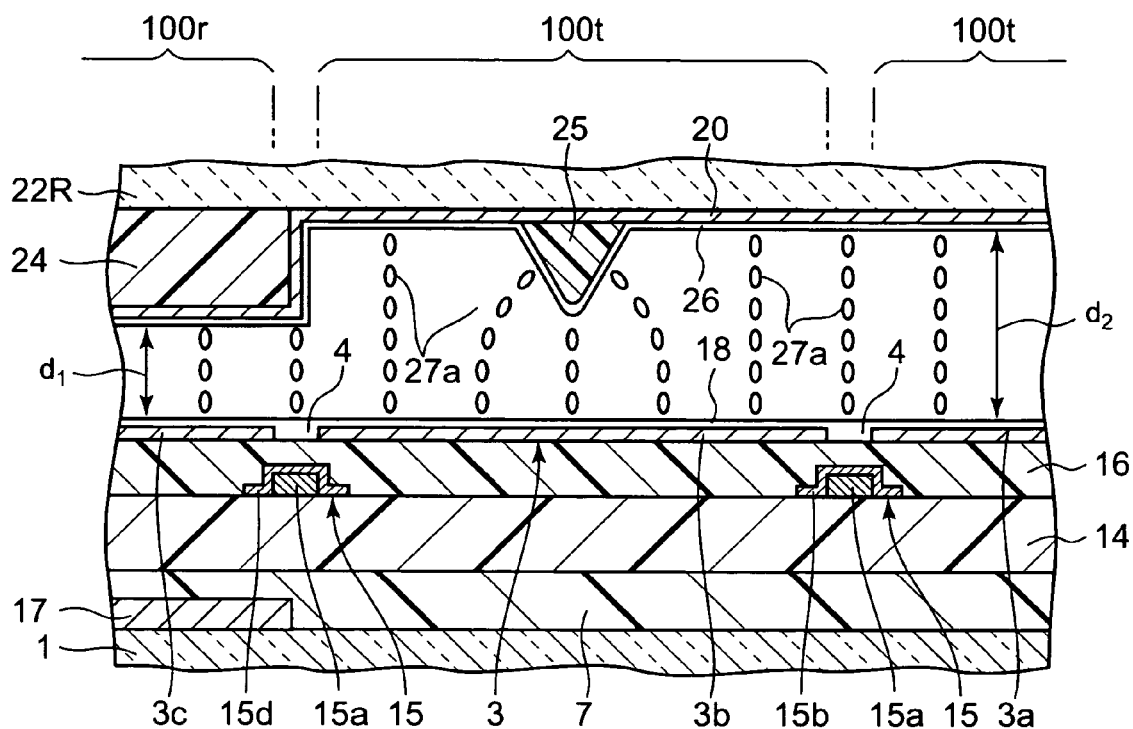
FIG. 8 is an expanded cross sectional view showing a part of FIG. 7 in expansion.

FIGS. 6 to 8 show the second embodiment of the present invention, where FIG. 6 is a plan view showing a part of a liquid crystal display device, FIG. 7 is a cross sectional view of the liquid crystal display device as taken along a VII-VII line of FIG. 6, and FIG. 8 is an expanded cross sectional view showing a part of FIG. 7 in expansion. In the present embodiment, the components corresponding to the above-described first embodiment will be denoted by the same reference numerals, and explanation for these components will be omitted.

The liquid crystal display device according to the present embodiment has a plurality of projections 25 provided on the internal surface of the front substrate 2 on which the opposing electrode 20 is formed, such that the projections 25 respectively correspond to the center of at least one electrode portion among the electrode portions 3a, 3b, and 3c separated by the slits 4 provided for each of the plurality of pixel electrodes 3 on the rear substrate 1, and is identical to the first embodiment in the other respects.

According to the present embodiment, the projections 25 are formed correspondingly to about the center of the two electrode portions 3a and 3b, which form the transmissive display regions 100t in which the liquid crystal layer thickness $d_2$ is larger, among the three electrode portions 3a, 3b, and 3c separated by the slits 4 of each of the pixel electrodes 3.

The projections 25 are made of a dielectric material such as photosensitive resin, etc. and formed on the opposing electrode 20 on the substrate surface of the front substrate 2 to have, for example, a circular conic shape, as illustrated. The projections 25 may not necessarily be formed into a circular conic shape as long as they are formed into a shape whose plan cross-sectional view is circular, and whose diameter decreases toward the projection end, so they may be formed into a frustconical shape or a semispherical shape. The homeotropic alignment film 26 is formed to cover the plurality of projections 25 and the opposing electrode 20.

The diameter of the base (the maximum diameter portion) of the projections 25 is set to be equal to or smaller than ⅕, preferably, equal to or smaller than ¹⁄₁₀ of the width of the electrode portions 3a, 3b, ad 3c. The height of the projections 25 is set to be smaller than the thickness of the liquid crystal layer thickness adjusting layer 24, which sets the liquid crystal layer thickness $d_1$ in the reflective display region 100r of each pixel 100 to be smaller than the liquid crystal layer thickness $d_2$ in the transmissive display regions 100t.

According to the present embodiment, dot-shaped black masks 21a made of the same light shielding film as the lattice-shaped black mask 21 facing the regions between the plurality of pixels 100 are formed on the substrate surface of the front substrate 2 so as to correspond to the plurality of projections 25.

That is, the present liquid crystal display device has the plurality of projections 25 formed on the internal surface of the front substrate 2 on which the opposing electrode 20 is formed, such that the projections 25 correspond to about the center of at least one electrode portion among the electrode portions 3a, 3b, and 3c separated by the slits 4 of each of the plurality of pixel electrodes 3 on the rear substrate 1. This makes the liquid crystal molecules 27a of the liquid crystal layer 27 aligned substantially perpendicularly to the surface of the substrates 1 and 2 in the regions other than the regions corresponding to the projections 25 as shown in FIG. 8, due to the homeotropic directivity of the homeotropic alignment films 18 and 26 formed on the internal surfaces of the pair of substrates 1 and 2. In the regions corresponding to the projections 25, the liquid crystal molecules 27a in the neighborhood of the projections 25 on the front substrate 2 are aligned such that the longer axis of the molecules is arranged in the directions substantially perpendicular to the circumferential surface and top surface of the projections 25, to match the shape of the projections 25.

In the present liquid crystal display device, since the liquid crystal molecules 27a in the neighborhood of the projections 25 formed correspondingly to the center of each of the electrode portions 3a, 3b, and 3c of the pixel electrodes 3 are aligned such that the longer axis of the molecules is perpendicular to the homeotropic alignment film 26, the liquid crystal molecules 27a in the surrounding regions are guided to the aligning directions of the liquid crystal molecules 27a in the neighborhood of the projections 25 to be aligned to lie down toward the projections 25. Therefore, when a voltage is applied across the pixel electrode 3 and the opposing electrode 20, the liquid crystal molecules 27a in the electrode portions 3a, 3b, and 3c are aligned to lie down toward the projection 25 as the center of alignment. Thus, the alignment state of the liquid crystal molecules 27a in the regions provided with the projections 25 can be stabilized in each of the electrode portions 3a, 3b, and 3c.

Further, according to the present embodiment, since the projections 25 are formed into a shape whose cross sectional shape parallel with the substrate surface of the substrate 2 is circular and whose diameter decreases toward the projection end, the liquid crystal molecules 27a in the regions corresponding to the electrode portions 3a and 3b for which the projections 25 are provided correspondingly can be aligned to lie down toward the projections 25 from all the circumference surrounding the projections 25, with a high stability.

Furthermore, according to the present embodiment, since the projections 25 are formed to correspond to the electrode portions 3a and 3b, which form the transmissive display regions 100t, among the plurality of electrode portions 3a, 3b, and 3c separated by the slits 4 of the pixel electrode 3, the liquid crystal molecules 27a in the transmissive display regions 100t in which the liquid crystal layer thickness $d_2$ is larger can more stably be aligned to lie down toward the center of the regions corresponding to the electrode portions 3a and 3b, making it possible to increase the display quality of the transmissive display.

Since the liquid crystal layer thickness $d_1$ in the reflective display region 100r is smaller than the liquid crystal layer thickness $d_2$ in the transmissive display regions 100t and a stronger electric field is applied to the reflective display region 100r, the liquid crystal molecules 27a in the region corresponding to the reflective display region 100r can be stably aligned to lie down toward the center of the region even if no projection is formed that corresponds to the center of the region.

Further, according to the present embodiment, since the dot-shaped black masks 21a are formed on the substrate surface of the front substrate 2 correspondingly to the plurality of projections 25 respectively, it is possible to eliminate any light leak to the observer side, which might arise due to the alignment state of the liquid crystal molecules 27a in the region corresponding to the projections 25 (a state that the liquid crystal molecules 27a in the neighborhood of the projections 25 on the front substrate 2 are aligned such that their longer axis is arranged in the directions perpendicular to the circumferential surface and top surface of the projections 25, and the liquid crystal molecules 27a in the neighborhood of the rear substrate 1 are aligned substantially perpendicularly to the surface of the rear substrate 1).

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-344131 filed on Nov. 29, 2005 and including specification, claims, drawings and summary. The disclosure of the above Japanese Patent Application is incorporated herein by reference in its entirety.

What is claimed is:

1. A liquid crystal display device comprising:
   a first substrate on which a pixel electrode is formed for each pixel, the pixel electrode being connected to a thin film transistor; and
   a second substrate disposed to face the first substrate via a liquid crystal layer with liquid crystals having negative dielectric anisotropy;
   wherein the pixel electrode comprises a plurality of electrode portions divided by slits and a continuing portion which connects the plurality of electrode portions, wherein the slits expose an insulating film from the pixel electrode;
   wherein at least one region corresponding to at least one electrode portion, among the plurality of electrode portions, is set to be a transmissive display region which passes light to the second substrate, the light being incident from the first substrate to the liquid crystal layer,
   wherein a region corresponding to a remaining electrode portion, among the plurality of electrode portions, is set to be a reflective display region which reflects light to the second substrate, the light being incident from the second substrate to the liquid crystal layer;
   wherein the at least one electrode portion corresponding to the transmissive display region is arranged so as to have a bottom surface thereof in contact with the insulating film; and
   wherein the remaining electrode portion corresponding to the reflective display region is arranged so as to have an entire bottom surface thereof in contact with the insulating film.

2. The liquid crystal display device according to claim 1, wherein:
   the plurality of electrode portions are made of a transparent material; and
   each of the plurality of electrode portions is in contact with the insulating film.

3. The liquid crystal display device according to claim 1, wherein the first substrate is formed with auxiliary electrodes, which are provided in a lower portion of the insulating film and which cover the slits.

4. The liquid crystal display device according to claim 3, wherein:
   the second substrate is formed with an opposing electrode whose potential is set equal for each pixel; and
   a potential of the auxiliary electrodes is set equal to the potential of the opposing electrode.

5. The liquid crystal display device according to claim 4, wherein a reflective layer is formed below an auxiliary electrode in the reflective display region.

6. The liquid crystal display device according to claim 1, wherein a reflective layer is formed below the insulating film in the reflective display region.

7. The liquid crystal display device according to claim 1, wherein the slits are formed parallel to a direction along which gate lines run.

8. The liquid crystal display device according to claim 7, wherein:
the pixel electrode comprises three electrode portions; and
each of regions corresponding to two electrode portions among the three electrode portions are set to be the transmissive display region, and a region corresponding to the remaining one electrode portion is set to be the reflective display region.

9. The liquid crystal display device according to claim 1, wherein:
an external shape of each electrode portion is square; and
the continuing portion connects corners of the electrode portions.

10. The liquid crystal display device according to claim 1, wherein the electrode portions each have an equal area.

11. The liquid crystal display device according to claim 1, wherein when voltage is not applied between the pixel electrode and an opposing electrode, the liquid crystals of the liquid crystal layer are vertically aligned.

12. The liquid crystal display device according to claim 1, wherein a thickness of the liquid crystal layer corresponding to the reflective display region is set to be substantially ½ a thickness of the liquid crystal layer corresponding to the transmissive display region.

13. The liquid crystal display device according to claim 1, wherein the second substrate is formed with a liquid crystal layer thickness adjusting layer, which is provided to make a thickness of the liquid crystal layer corresponding to the reflective display region smaller than a thickness of the liquid crystal layer corresponding to the transmissive display region.

14. The liquid crystal display device according to claim 13, wherein the second substrate is formed with projections, and wherein each projection is formed in a corresponding transmissive display region and has a height less than a height of the liquid crystal layer thickness adjusting layer.

15. The liquid crystal display device according to claim 14, wherein the projections are formed at positions corresponding to centers of the electrode portions.

16. The liquid crystal display device according to claim 15, wherein the projections have a conical shape.

17. The liquid crystal display device according to claim 1, wherein:
the second substrate is formed with a color filter of a specific color component for each pixel; and
the color filter has a non-coloring portion at least at a portion of the reflective display region.

18. The liquid crystal display device according to claim 17, wherein the non-coloring portion is formed at a position corresponding to a center of the corresponding electrode portion.

19. The liquid crystal display device according to claim 18, wherein the non-coloring portion has a rectangle shape.

20. The liquid crystal display device according to claim 1, wherein for each pixel, the electrode portions thereof are provided to be aligned in one line in a direction along which data lines run.

* * * * *